United States Patent [19]

Lim

[11] Patent Number: 5,139,839
[45] Date of Patent: Aug. 18, 1992

[54] THERMAL INSULATION BLANKET

[75] Inventor: Ek J. T. Lim, Bullcreek, Australia

[73] Assignee: Applied Insulation Pty Ltd., Kewdale, Australia

[21] Appl. No.: 582,869

[22] PCT Filed: Apr. 20, 1989

[86] PCT No.: PCT/AU89/00172
  § 371 Date: Oct. 15, 1990
  § 102(e) Date: Oct. 15, 1990

[87] PCT Pub. No.: WO89/10513
  PCT Pub. Date: Nov. 2, 1989

[30] Foreign Application Priority Data

Apr. 20, 1988 [AU] Australia .................. PI 7836

[51] Int. Cl.$^5$ .................. B32B 1/06; B32B 3/04; B32B 15/02

[52] U.S. Cl. .................. 428/76; 428/75; 428/102; 428/123; 428/125; 428/127; 428/247; 428/256; 428/920

[58] Field of Search .................. 428/75, 102, 123, 125, 428/127, 247, 256, 196, 920, 76; 138/149

[56] References Cited

U.S. PATENT DOCUMENTS 2,153,352  4/1939  Steinberger .................. 428/195
4,442,585  4/1984  McGehee .................. 29/455.1

Primary Examiner—Alexander S. Thomas
Attorney, Agent, or Firm—Reising, Ethington, Barnard, Perry & Milton

[57] ABSTRACT

A thermal insulating blanket (10) containing insulation material (22) such as ceramic fibre, rock wool or fibre glass enclosed with a cloth (14), has a layer of woven metal mesh (16) surrounding the insulation material (12).

5 Claims, 3 Drawing Sheets

THERMAL INSULATION BLANKET

DESCRIPTION

This invention relates to a thermal insulation blanket.

FIELD OF THE INVENTION

Thermal insulation blankets are commonly used on exhausts, turbochargers and other heat generating elements of boats, ships, trucks, power generators and the like. The thermal insulation material comprises a layer of a thermally insulating material typically formed of mineral fibre such as ceramic fibre rock wool or fibre glass.

There are several shortcomings in this technique of thermal insulation. For example, thermal insulation blankets are typically quite fragile and easily damaged through abrasion possibly caused by vibration or incurred during maintenance of machinery. It is important that the insulating blanket maintains its shape so as to provide efficient insulation. With extended use it is known for insulation blankets to become distorted and therefore act inefficiently. Extended use, vibration and distortion of shape may lead to insulation material becoming dislodged and entering the machinery, possibly causing damage and disruption of function.

SUMMARY OF THE INVENTION

The present invention provides a thermal insulation blanket in which the aforementioned inefficiencies and problems of the prior art are reduced.

In accordance with one aspect of the present invention there is provided a thermal insulation blanket comprising a layer of thermal insulation material which is enclosed by a layer of woven metal wire mesh.

In accordance with the present invention the woven metal wire mesh is preferably attached to the layer of insulation material in such manner that there is little movement of the woven metal wire mesh with respect to the insulation material.

BRIEF DESCRIPTION OF THE DRAWINGS

The present invention will now be described, by way of example, with reference to the accompanying drawings, in which.

DESCRIPTION OF THE INVENTION

Figure 1:
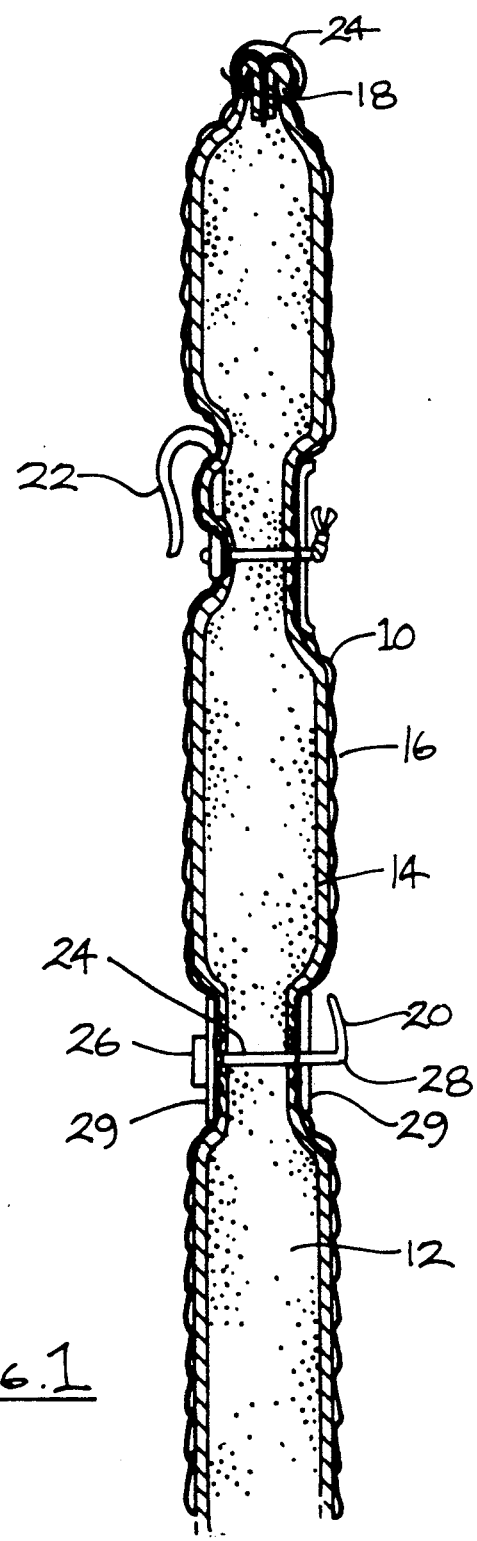
FIG. 1 is a schematic sectional elevation through part of a thermal insulation blanket in accordance with the present invention.
Figure 2:
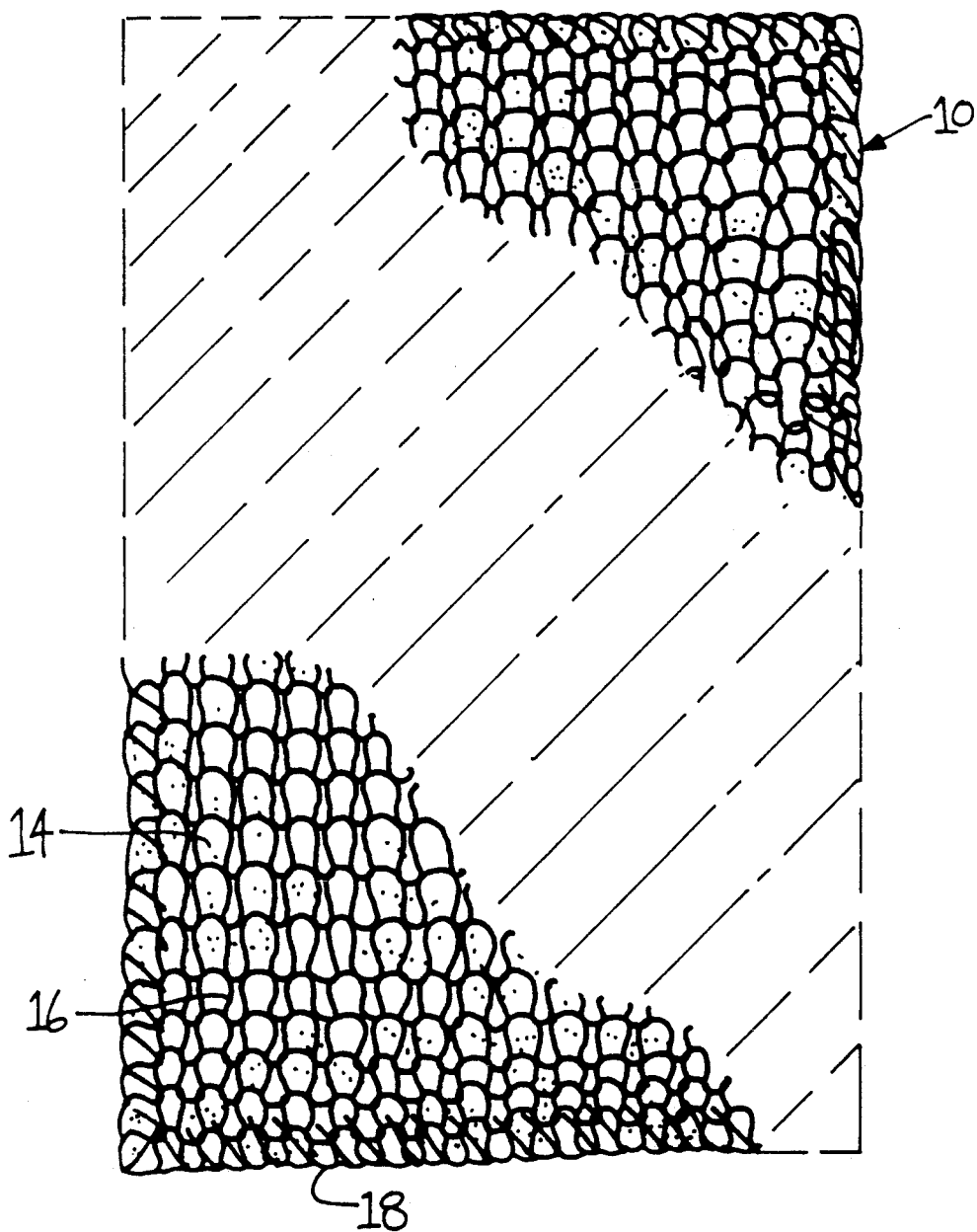
FIG. 2 is a plan view of an insulation blanket in accordance with the present invention.

In the accompanying drawings, there is shown a thermal insluation blanket 10. The thermal insulation blanket 10 comprises a central layer of insulation material 12 enclosed within a layer of cloth 14 as shown in FIG. 1. Located externally of the layer of cloth 14 is a layer of woven stainless steel wire mesh 16 which encloses the layer of cloth 14 and the layer of insulation material 12. FIG. 2 shows the layer of woven stainless steel wire mesh 16 covering the whole of one surface of the layer of the cloth 14. The layer 16, as mentioned above encloses completely the layer of cloth 14 and the layer of insulation material 12.

Figure 3:
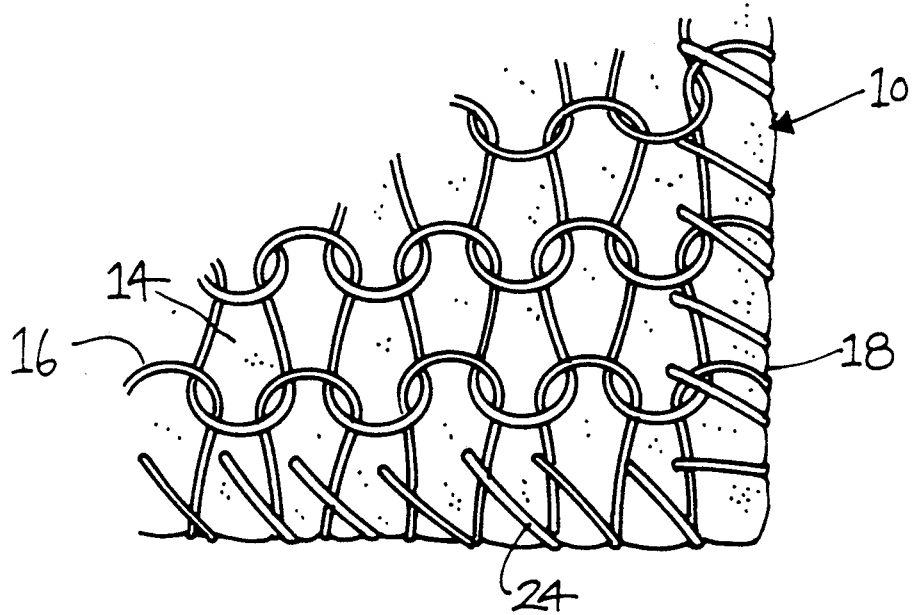
FIG. 3 is a plan view to an enlarged scale of one corner of the insulation blanket of FIG. 2 showing a woven wire mesh and stitching at edges of the blanket.

Typically, the woven stainless steel wire mesh 16 is woven in an interlocking loop pattern as shown in FIG. 3 although variations in the weave pattern are possible. The thermal insulation blanket 10 has edges 18. As shown in FIG. 1, the edges 18 may be formed by gathering or inturning of free edges of opposed pieces of cloth forming the layer 14 together with opposed free edges of the woven stainless steel wire mesh 16. The inturned edges of the layers 14 and 16 may project into the layer of insulation material 12 as shown in FIG. 1.

The gathering or inturning of the layers of cloth and mesh results in the woven stainless steel wire mesh 16 being innermost at the edge 18 of the thermal insulation blanket 10.

Further to increase the strength of the edges 18 the gathered or doubled over portions of the layers of cloth and mesh are stitched through with fine stainless steel wire 24 as shown in FIG. 1. The edge stitching is shown in more detail in FIG. 3.

This combination of gathering and stitching at the edges 18 reduces the movement of the layer of woven stainless steel wire mesh 16 relative to the layer of cloth 14 and thus reduces wear on the cloth 14. This also maintains the shape of the thermal insulation blanket 10.

However, the cloth and the mesh can in some instances simply be folded over at the edges 18. This method of forming an edge 18 of the blanket 10 is convenient.

However, the gathered or doubled over technique shown in FIG. 1 is extremely useful where the cloth and mesh have free edges which need to be joined together to enclose the layer of thermal insulation material 12.

Also, the free edges of the cloth could be stitched separately and the woven wire mesh then wrapped around the layer of cloth 14. The free edges of the woven wire mesh could then be stitched together seperately from the cloth. As shown in FIG. 1 clips 20 and hooks 22 may be used in the thermal insulation blanket 10.

The clips 20 may be used on large thermal insulation blankets 10 to augment the support given by the gathered edges 18 and to reduce further movement of the woven stainless steel wire mesh 16 relative to the cloth 14. The hooks 22 may be used to anchor the thermal insulation blanket 10 in a working position and also help prevent movement of the woven stainless steel mesh 16. Typically, the clips 20 comprise pins 25 which pass through the full thickness of the thermal insulation blanket 10. The pins 25 each may comprise a head 26 at one end and a hook 28 at an opposite end. To reduce fraying of the layer of mesh 16 and the cloth 14 there may also be provided a respective metal plate 29 between each of the head 26 and the hook 28 and the body of the blanket 10.

Further, depending upon the desired shape of the structure to be insulated, several individual sections of thermal insulation blanket 10, each constructed as previously described, may be joined by stitching with stainless steel wire.

Still further, the thermal insulation blanket 10 shown in FIGS. 1 to 3 does not tend to lose its shape or cause excessive wear on the layer of cloth 14 or the underlying insulation material 12 thereby maintaining its insulating properties at a maximum.

As an alternative to stitching of the edges 18, the edges 18 could be stapled.

Modifications and variations such as would be apparent to a skilled addressee are deemed within the scope of the present invention.

I claim:

1. A thermal insulation blanket which comprises a layer of thermal insulation material enclosed by a layer of woven metal mesh, and a layer of cloth enclosing the layer of thermal insulation material which layer of cloth is located between the layer of insulation material and the layer of mesh wherein the layer of mesh has an edge portion which is formed by inturning free edges of the mesh layer to form adjacent inturned mesh portions and attaching together the inturned mesh portions with metal wire and the inturned mesh portions are attached to inturned free edges of the layer of cloth.

2. A thermal insulation blanket according to claim 1, wherein the woven metal mesh is formed in an interlocking loop pattern.

3. A thermal insulation blanket according to claim 1, wherein the woven metal mesh is a woven stainless steel metal mesh.

4. A thermal insulation blanket according to claim 1, wherein the inturned mesh portions are attached by stitching the metal wire.

5. A thermal insulation blanket according to claim 1, wherein the inturned mesh portions are attached by stapling the metal wire.

* * * * *